Jan. 26, 1960
V. JOSEPHSON
2,922,890
MAGNETIC METHOD FOR PRODUCING HIGH
VELOCITY SHOCK WAVES IN GASES
Filed Oct. 8, 1957
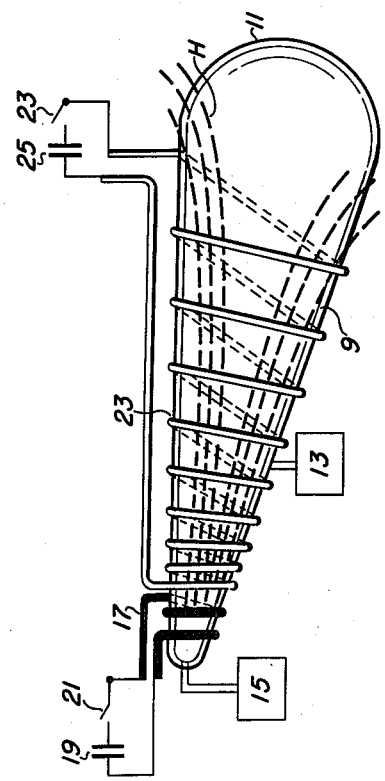
INVENTOR.
Vernal Josephson
BY

United States Patent Office 2,922,890
Patented Jan. 26, 1960

2,922,890

MAGNETIC METHOD FOR PRODUCING HIGH VELOCITY SHOCK WAVES IN GASES

Vernal Josephson, Palos Verdes Estates, Calif., assignor to the United States of America as represented by the United States Atomic Energy Commission Application October 8, 1957, Serial No. 689,019

5 Claims. (Cl. 250—84.5)

The present invention relates to apparatus for producing shock waves in gases. Such shock waves are generated by ionizing a gas and causing heating as a result of the "Joule" effect and by the action of the magnetic field of the induced currents in the ionized mass in itself and with an external magnetic field. Resulting exceedingly hot plasmas are useful for numerous purposes, including as a light source for high speed photography, producing X-rays or neutrons, or as a source of hot plasma for injection into other apparatus.

In accordance with the present invention, a rarified gas is ionized by the passage through the gas of a rapidly changing high intensity magnetic field. The ionization of the gas in a tapered tube results in a shock wave progressing toward the large end of the tube, but the effect is very much intensified by the presence of a rapidly growing in density of a diverging magnetic field. The self-inductance of a coil suitable for the diverging magnetic field is so great as to limit the time-rate-of-change of the magnetic field so that it is not suitable in itself for creating the initial ionization of a gas. Therefore, in accordance with the present invention, two coils are provided, one of exceedingly low inductance and the other having the required inductance necessary for establishing an elongated diverging field.

It is accordingly an objective of the present invention to provide apparatus for creating high velocity shock waves in gases without the utilization of electrodes in the gaseous zone.

Other objectives and advantages of the present invention will become apparent from the following description taken with the drawing made a part of this specification.

Referring to the drawing, a container 9 of insulating material such as glass or quartz is utilized to contain the selected gas to be ionized and compressed. This container is of elongated conical shape for the most part and may be provided with a closure dome 11 at the large end thereof which is transparent to light or X-rays as the case may be. In the event, however, that this apparatus is to be utilized as a plasma source for injecting plasma masses into other equipment, the large end of the conical section would be ported into such other apparatus. In order that only that gas which has a desired characteristic for a specific purpose will be present in the device, evacuating and purging apparatus 13 of any kind well known in the art is utilized and connected with the interior of the vessel. A source of select gas is provided at 15 and connects with the interior of the small end of the vessel. The atmosphere in the vessel is preferably at a pressure of between from 1 to 1000 microns.

A coil 17 of exceedingly low inductance is supported on the small end of the vessel and is connected through switch 21 to a source of current at high potential as represented by capacitor 19. Switch 21 is shown as an ordinary switch for purposes of simplicity, but in practice, in order to handle voltages of from 12 to 25 kilovolts, and currents resulting from the discharge of a capacitor of from 6 to 12 microfarads charged to that potential, it would be a massive switch of the ignitron or spark gap type. The closure of switch 21 results in an exceedingly high time-rate-of-change magnetic field in the gaseous region in the small end of the vessel which results in ionization of the gas. Once a state of ionization has been created within the gas, it becomes apparent that the ionized gas may become, in effect, a short-circuited single-turn secondary winding of a transformer constituted by itself and winding 17. The interacting magnetic fields between the currents in the plasma and that of winding 17 establishes further heating of the plasma by inward compression.

At the same time that coil 17 is energized, coil 23 is also initially energized by the closure of switch 23 which connects it in series with electrical energy source 25. This source is a capacitor having a capacitance value as high as 200 microfarads and charged to a potential of from 10 to 25 kilovolts. The magnetic field created by the coils is diverging in geometry and therefore the plasma initially established and preheated by coil 17 is caused to further compress and pinch with the pinch progressing from the small end to the large end of the vessel with the result that the gaseous plasma is propelled by a force directed toward the large end of the conical vessel. The resulting very hot plasma can be used as a source of short duration high intensity light for photographic purposes or as indicated above, it can be utilized for other purposes. In the application of the device for producing X-rays the gas may be argon and for producing neutrons the gas may be deuterium or a mixture of deuterium and tritium.

The foregoing has described a device for producing exceedingly high temperatures in gaseous plasmas. These high temperatures result in phenomena that can be utilized for various useful purposes such as illumination for photographic purposes, the generation of X-rays if argon gas is selected, and the generation of neutrons if, for example, deuterium or a mixture of deuterium and tritium is utilized. The above described embodiment is presented for the purpose of facilitating the explanation of this invention and not for purposes of limiting the scope thereof. It is understood that other ramifications are likely and possible within the spirit of this invention and, accordingly, it is desired that it be understood that the invention be considered limited only by the appended claims taken in view of the prior art.

What is claimed is:

1. A device for producing high energy plasmas comprising a tapered shock tube of dielectric material and having a closed small end, an exceedingly low-inductance coil supported about and axially aligned with the small end of said tapered tube, an elongated multi-turn coil supported upon the remainder of the exterior wall of the shock tube, a potential source and switch means connected in series with said low-inductance coil and a potential source and switch means connected in series with said elongated coil, means for hermetically sealing the large end of said tube, means for purging said tube of gases and means for admitting a selected gas into said shock tube.

2. The device of claim 1 in which the first mentioned potential source is a capacitor having a capacitance of from 6 to 12 microfarads and charged to a potential between from 12 to 25 kilovolts and said second mentioned potential source is a capacitor having a capacitance in the neighborhood of 200 microfarads and charged to a potential between from 10 to 25 kilovolts.

3. The device of claim 2 in which the gas is argon at a pressure of from 1 to 1000 microns and the tapered tube large end is hermetically closed by a member transparent to X-rays.

4. The device of claim 2 in which the gas is deuterium at a pressure of from 1 to 1000 microns and the tapered tube large end is closed by a member transparent to neutrons.

5. The device of claim 2 in which the gas is hydrogen and the tapered tube is closed by a member transparent to light.

References Cited in the file of this patent

UNITED STATES PATENTS

| Re. 21,150 | Von Lepel | July 11, 1939 |
| 1,604,986 | Garity | Nov. 2, 1926 |
| 1,844,420 | Buttolph | Feb. 9, 1932 |
| 2,030,957 | Bethenod et al. | Feb. 18, 1936 |
| 2,326,773 | Floyd | Aug. 17, 1943 |
| 2,826,708 | Foster | Mar. 11, 1958 |

OTHER REFERENCES

Kurchatov, Discovery, vol. 17, No. 6, June 1956, pp. 227–233.

Burkhardt et al.: Journal of Applied Physics, vol. 28, No. 5, pp. 519–521.